Aug. 9, 1927.
H. C. GREGG
1,638,303
EGG RECEPTACLE FOR INCUBATORS
Filed Oct. 26, 1921
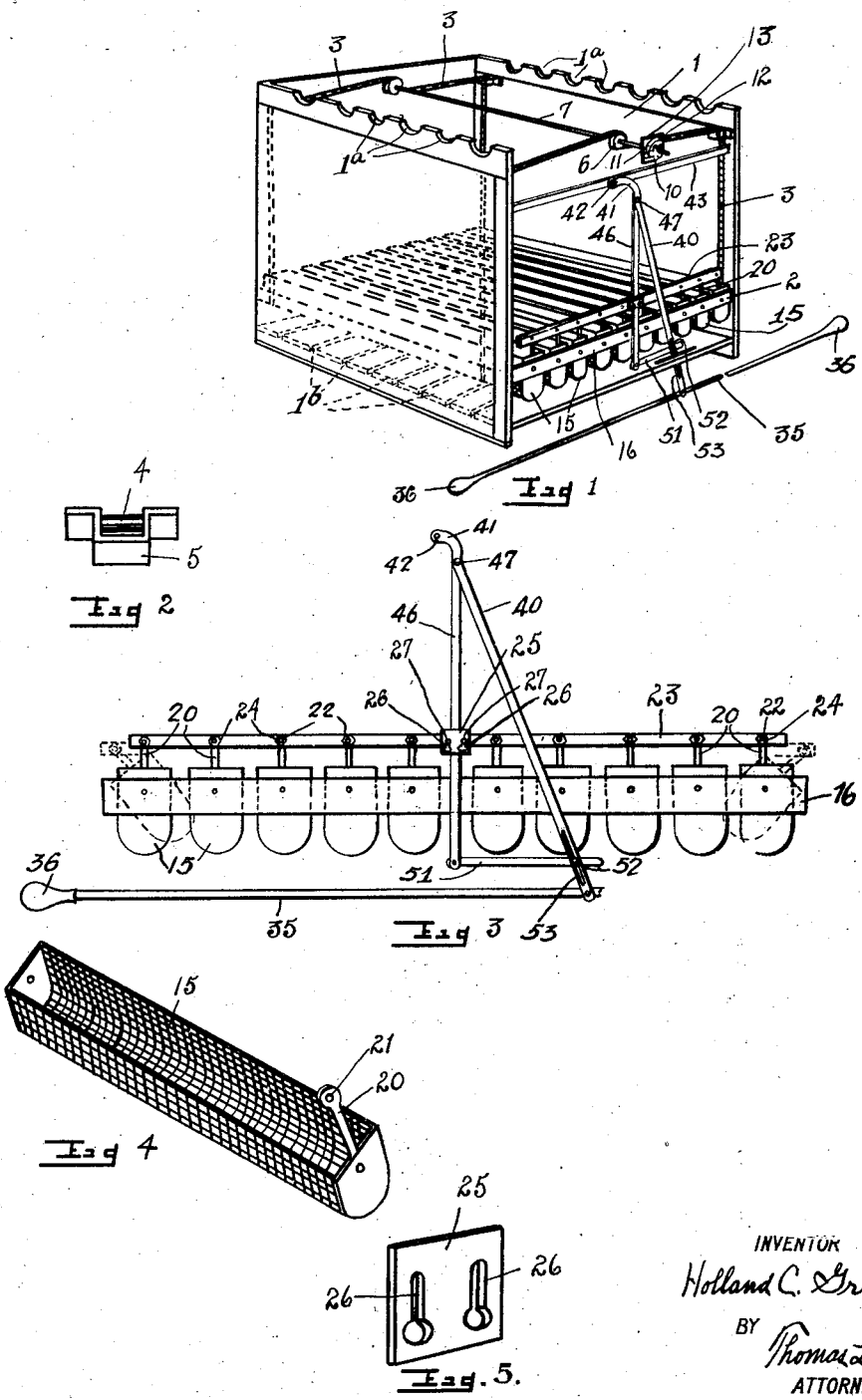
INVENTOR
Holland C. Gregg
BY
Thomas L. Wilden
ATTORNEY Patented Aug. 9, 1927.

1,638,303

UNITED STATES PATENT OFFICE.

HOLLAND C. GREGG, OF ITHACA, NEW YORK, ASSIGNOR, BY MESNE ASSIGNMENTS, TO ANNIE S. EVELETH, OF LITTLE FALLS, NEW YORK.

EGG RECEPTACLE FOR INCUBATORS.

Application filed October 26, 1921. Serial No. 510,584.

My invention relates to an egg receptacle for incubators, and I declare the following to be a full, clear, concise and exact description thereof sufficient to enable anyone skilled in the art to which it appertains to make and use the same reference being had to the accompanying drawings in which like reference characters refer to like parts throughout the specification.

The object of the invention is to provide an egg receptacle for incubators that is adapted to move in a vertical plane, as well as to effect a rocking of the members that carry the eggs, irrespective of the vertical position of said plane.

The necessity for turning the eggs, depends upon the fact that unless the egg is turned, its substance will gravitate, the egg will become too dry upon one side, and the chick will become attached to this dry side. Such an event will result in a dead or deformed chick.

The object will appear by referring to the drawings in which:

Fig. 1 is a perspective view of a single compartment of an incubator with the front and top sides removed, whereby to show the novel egg tray receptacle within;

Fig. 2 is an enlarged detail view in perspective of a bracket carrying a roller employed;

Fig. 3 is an enlarged detail view in side elevation of the egg tray receptacle; and immediate parts for actuating the same.

Fig. 4 is an enlarged detail view of a basket employed for holding the eggs;

Fig. 5 is an enlarged detail perspective view of a plate.

Referring more particularly to the drawings, one of the plurality of sections or compartments of an incubator is shown at 1 and is equipped with a tray frame 2 supported or rather suspended by chains 3 attached to each corner of the tray frame. The chains 3 are adapted to run over pulleys or rollers 4 carried in bearings formed in the brackets 5, which brackets 5 are attached near the top and adjacent the four corners to the wall of casing 1. Notches 1ᵃ are formed in the upper opposite edges of the wall of casing 1 for the purpose of carrying the steam pipes not shown. The bottom boards 1ᵇ of the compartment are spaced for ventilation. The opposite ends of chains 3 are secured in pairs to the spools 6 mounted to revolve with the rock shaft 7. Each pair of ends of chains 3 are attached at diametrically opposite sides to each of spools 6, whereby each chain 3 of each pair will pull in an opposite direction to the other chain of the pair, whereby to actuate the tray frame in a vertical plane.

Rock shaft 7 has bearings in the casing 1 and has mounted on its front end a ratchet 10 adapted to be engaged by a releasing pawl 11 that is fulcrumed at 12 to a plate 13 mounted to the casing 1. The outer end of shaft 7 is angled for the application of the socket of a crank handle, whereby to turn said shaft 7 to, thereby, elevate or lower the tray frame 2.

Tray frame 2 supports the rock baskets 15 that are pivoted at either end to opposite sides 16 of the tray frame 2. An upstanding bracket 20 is fastened at one end to each of the baskets 15. The brackets 20 are equipped at their upper ends with apertures 21 adapted for the projection therethrough of bolts 22 fastened to the bars 23 by nuts 24. Baskets 15 are thus fastened to bars 23 in sets of five.

The bars 23 of each set, there being two in each compartment, are attached together by a plate 25 that is equipped with two key-hole slots 26, 26 adapted to be engaged by the headed bolts 27 that project laterally from each of the bars 23.

The mechanism for rocking the baskets 15 embodies a lever 40 having a curved or goose neck end 41 fulcrumed at 42 to the frame 43 of the incubator. The lower end of lever 40 is pivoted to the common horizontally disposed rod 35. Rod 35 has at either end a handle 36, whereby it may be manually actuated.

A rod 46 is fulcrumed at 47 to the lever 40 and is adapted to pass down between the demountable plate 25 and the contiguous end of bars 23, 23. The lower end of rod 46 is pivoted to one end of a link 51. The other end of link 51 carries a laterally projecting pin 52 having a head, whereby to engage in a loose manner a narrow elongated slot 53 formed in lever 40. When two or more compartments such as that shown in Fig. 1 are disposed adjacent each other, vertical rods similar to rod 46 of each compartment will be pivoted to a common horizontally disposed rod such as 35. Said pin 52 can ride up and down in slot 53 to allow for the free movement of the adjacent end of link 51. By this arrangement, the degree of movement of the common connecting rod 35 will be less than it would be if vertical rod 46 were connected to rod 35 and no link 51 used, and this irrespective of the vertical position of tray frame 2, whereby to effect the proper turning of baskets 15.

In operation, the eggs are disposed in the baskets 15, which are elevated in the compartment 1 when the incubation commences. As said incubation progresses, however, the tray frame 2 is lowered gradually by turning the shaft 7 by means of a crank handle, not shown. Periodically, the baskets 15 are rocked by manually grasping handle 36 of rod 35 and actuating same in a longitudinal direction. The extreme position of said rocking is shown by dotted lines in Fig. 3. The rocking of the baskets 15 will insure the movement of the substance in each egg and prevent said substance from gravitating which would allow the eggs to become dry upon one side and would cause the chick to become attached to this dry side, thus producing a dead or deformed chick.

Inasmuch as the heat is admitted at the top of the compartment and, inasmuch as the animal heat from the eggs increases from day to day, the mechanism for lowering the tray frames is adapted to compensate for this difference.

Furthermore, the tray frame is tilted slightly in order to compensate for the variation in temperature near one side, where the door of any well known construction is located, which side is cooler than the other sides of the compartment that are contiguous with other incubator chambers.

It will be noted that all the baskets in the several compartments, where more than one are used, can be rocked by manipulating the handle 36.

Having thus described my invention, what I claim as new and desire to secure by Letters Patent is:

1. In an egg receptacle for incubators, a plurality of vertically movable tray frames, rocking baskets carried by said tray-frames, means for actuating said tray frames, connecting bars attached to said baskets, a plate having means for connecting said bars, a rod adapted to pass under said plate, a lever to which said last named rod is connected, and means connecting said lever and rod, whereby to rock said baskets.

2. In an egg receptacle for incubators, a plurality of vertically movable tray frames, rocking baskets carried by said tray-frames, means for actuating said tray frames, connecting bars attached to said baskets, a plate having key-hole slots for connecting said bars, a rod adapted to pass under said plate, a lever to which said last named rod is connected, and a link connecting said lever and rod, whereby to rock said baskets.

3. In an egg receptacle for incubators, a plurality of vertically movable tray frames, slightly tilted, rocking baskets carried by said tray frames, chains for actuating said tray frames in a vertical plane, connecting bars attached to said baskets, a plate having key-hole slots for connecting said bars, a rod adapted to pass beneath said plate, a lever to which last named rod is pivoted, a link connecting said lever and rod, and a common connecting rod for actuating said lever, whereby to rock the baskets.

In testimony whereof I have affixed my signature.

HOLLAND C. GREGG.